US008007581B2

(12) United States Patent
Scott et al.

(10) Patent No.: US 8,007,581 B2
(45) Date of Patent: Aug. 30, 2011

(54) INCORPORATION OF DRILLING CUTTINGS INTO STABLE LOAD-BEARING STRUCTURES

(75) Inventors: Jonathan Blake Scott, Longview, TX (US); Billy Roy Scott, Diana, TX (US); Jeanne McCoy Scott, legal representative, Diana, TX (US); Dallas N. Little, Bryan, TX (US)

(73) Assignee: Scott Environmental Services, Inc., Longview, TX (US)

( * ) Notice: Subject to any disclaimer, the term of this patent is extended or adjusted under 35 U.S.C. 154(b) by 0 days.

(21) Appl. No.: 12/605,617

(22) Filed: Oct. 26, 2009

(65) Prior Publication Data
US 2010/0127429 A1 May 27, 2010

Related U.S. Application Data

(63) Continuation of application No. 10/037,630, filed on Jan. 3, 2002, now abandoned.

(60) Provisional application No. 60/311,439, filed on Aug. 10, 2001.

(51) Int. Cl.
*C08L 95/00* (2006.01)
(52) U.S. Cl. ............... 106/277; 106/281.1; 106/283; 106/705; 106/716
(58) Field of Classification Search .......... 106/277, 106/281.1, 283
See application file for complete search history.

(56) References Cited

U.S. PATENT DOCUMENTS 6,706,108 B2 * 3/2004 Polston ............ 106/285

* cited by examiner

*Primary Examiner* — Paul Marcantoni
(74) *Attorney, Agent, or Firm* — Paul & Paul

(57) ABSTRACT

Cuttings from drilling through or into natural rock and/or soil can be incorporated into useful, high quality load-bearing structures such as vehicle roads and pads for deep drilling rigs. This process recycles a material previously regarded as valueless at best and often as a pollution hazard. The cuttings, optionally mixed with drilling mud and/or soil, are converted to the useful structures by pozzolanic and/or cementitious reactions after being mixed with suitable other materials and/ or are bonded into the useful structures by asphaltic materials.

20 Claims, No Drawings

INCORPORATION OF DRILLING CUTTINGS INTO STABLE LOAD-BEARING STRUCTURES

CROSS-REFERENCE TO RELATED APPLICATIONS

This application is a continuation of application Ser. No. 10/037,630, filed on Jan. 3, 2002, which application claims the benefit of Provisional Application Ser. No. 60/311,439 filed Aug. 10, 2001. The entire contents of each application is incorporated herein by reference.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Field of the Invention

Drilling through or into natural soil and/or rock is performed in a variety of ways to serve practical ends. Any such drilling converts initially continuous solid soil and/or rock into particulate solid matter called "drilling cuttings," which have heretofore been generally regarded in the art as waste material to be disposed of as inexpensively as possible. Hereinafter, the term "drilling cuttings" and any of its grammatical variations shall be understood to mean such cuttings produced by drilling through and/or into natural soil or rock.

For practical reasons, drilling through or into natural soil and/or rock is commonly divided into two kinds: "shallow" and "deep." Relatively shallow drilling with a variety of means known in the art is used, for example, in construction of building foundations and mining excavations and in making water wells in areas where the water table is no more than a few tens of feet below the natural soil surface. Shallow drilling, simply because it is shallow, produces relatively low petroleum and/or natural gas often generates large volumes of cuttings. Therefore, even the most inexpensive possible disposition of the cuttings as waste, specifically burial of the cuttings in soil, often incurs a substantial expense.

Practical deep drilling normally requires more elaborate equipment than is usually used for shallow drilling. More specifically, deep drilling equipment normally comprises at least the following three conceptual entities:

drilling means, which, after the first few meters of drilling are within the hole being drilled (the "borehole") and are in physical contact with the solid soil and/or rock at the portion of the borehole that is to be enlarged during the next interval of drilling, and which, when suitably driven, convert the volume of solid material that corresponds to the enlargement of the borehole during this particular interval of drilling into particles sufficiently small to be readily removed from the borehole and transported to the earth's surface;

drilling driving means that supply the energy needed to cause the drilling means to provide actual drilling; and a fluid lubricant for the drilling means.

(Although these entities are conceptually distinct, the same physical material may serve as all or part of two or more of them, and in practice the lubricant is probably more often than not also a hydraulic fluid that acts as part of the drilling driving means.) The phrase "deep drilling" when used hereinafter in this specification shall be understood to mean drilling performed by equipment comprising said drilling means, drilling driving means, and fluid lubricant for the drilling means.

The currently most commonly used deep drilling means are various types of rotary drill bits well-known in the drilling art. In once widely practiced and still sometimes used "cable tool" drilling, the drilling means are essentially a hammer that is repeatedly lifted and dropped within the borehole in order to deepen it. In some laboratories today, laser light is being tested as a drilling means, and shock waves propagated through air or other fluids could reasonably be used as drilling means.

Typical deep drilling driving means may be: a solid structure of pipe or cable connected mechanically to the drilling means and rotated, or alternatively lifted and dropped, by motive power supplied at the surface so that the motion of the solid connecting structure is mechanically transferred to the drilling means; a combination of a hydraulic fluid, fluid transport means, and a pump that drives the hydraulic fluid, so that the motion of the hydraulic fluid, by its passage through suitably designed passageways in a rotary drill bit, forces the components of the bit to move in a manner that converts any coherent solid material adjacent to the rotary drill bit into particulates; a source of radiation that is absorbed by the surface of a volume of solid to be added to the volume of the borehole, the absorbing solid surface and part of the solid underlying it being thereby rapidly heated and caused to fracture by heating-induced expansion; and/or means for propagating mechanical shock waves through a fluid in contact with the surface of a volume of solid to be added to the volume of the borehole.

The least expensive possible deep drilling lubricant is the air of the natural atmosphere, and this is actually used in practice in some instances. Another established deep drilling lubricant is a foam of air in a continuous liquid phase, usually preponderantly of water.

However, practical deep drilling for oil and/or natural gas in most locations in the world that are now being explored requires use of a viscous liquid lubricant that comprises, preferably consists essentially of, or more preferably consists of at least one continuous liquid phase and at least one type of dispersed solid particles, most often a clay (such as sodium montmorillonite) that has a sufficiently fine particle size and sufficiently hydrophilic particle surfaces that the clay spontaneously disperses in most aqueous based liquids. (In oil-based lubricants and some water-based ones, additional surfactants are usually added to promote suspension of the clay and/or other solid constituents such as high density, water-insoluble "wetting agents" in the fluid.) Additional detailed information about deep drilling fluids is given in, e.g., H. C. H. Darley and George R. Gray, Composition and Properties of Drilling and Completion Fluids, 5th Ed. (Gulf Publishing Co., Houston, 1988), the entire disclosure of which, except for any part that may be contrary to an explicit statement herein, is hereby incorporated herein by reference. This deep drilling lubricant, when preponderantly liquid and often even when preponderantly gaseous, is generally called "drilling mud" or simply "mud" by those who use it, and the word "mud" when used below in this specification shall be understood to mean deep drilling mud or another deep drilling fluid unless expressly stated to the contrary or required by the context.

Mud normally is pumped continuously into and flows continuously out of a borehole whenever deep drilling is underway. The mud flows into and out of the borehole through separate passageways that are disposed so as to insure that mud pumped into the borehole must reach the near vicinity of the drilling means that is actually cutting a borehole deeper during drilling before the mud can enter any passageway through which mud flows out of the borehole during drilling. The mud serves to cool and lubricate the drilling means and to remove from the borehole soil and/or rock in the form of particles cut by the drilling means, such particles being commonly called "cuttings." (If these cuttings were not removed from the borehole, they would eventually clog the drilling means and make continued drilling impossible.)

The outflowing mixture of mud and cuttings from deep drilling is normally subjected to at least one separation process intended to separate the relatively large particle size cuttings from the relatively fine clay and any other suspended particles deliberately added as part of the drilling mud before it flows into the borehole. The cuttings from this separation are generally more or less wet with the fluid phase of the mixture of mud and cuttings from which they were separated and may contain relatively small portions of the dispersed and/or dissolved solids deliberately added to the drilling mud before it flows into the borehole.

Also, the cuttings as thus separated may be and often are remixed with all or part of the drilling mud used when deep drilling of a particular hole has been completed. The solids volume of the cuttings or mixture of the cuttings with no longer needed drilling mud is usually at least several hundred cubic meters for each well drilled to a depth of five thousand meters.

A major object of this invention is to convert and/or incorporate mixtures of drilling cuttings, optionally mixed with other constituents such as those of deep drilling mud, into stable load-bearing structures.

BRIEF SUMMARY OF THE INVENTION

It has been found that drilling cuttings and mixtures of the cuttings with drilling mud can be converted and/or incorporated into excellent high-load-bearing civil engineering structures such as vehicle roads and drilling pads by one or more processes as described in detail below. Embodiments of the invention include processes for such conversion, extended processes including additional operations that may be conventional in themselves, and the load-bearing structures made by a process according to the invention.

BRIEF DESCRIPTION OF THE SEVERAL VIEWS OF THE DRAWING(S)

Not Applicable.

DETAILED DESCRIPTION OF THE INVENTION AND PREFERRED EMBODIMENTS

A shaped load-bearing structure according to the invention is made by a process comprising, preferably consisting essentially of, or more preferably consisting of, the following operations:

Forming a particulate mixture comprising drilling cuttings; and at least one of groups (2.1) and (2.2) of sub-operations, said group (2.1) comprising sub-operations of:

(2.1.1) mixing said particulate mixture comprising drilling cuttings in a specified proportion with at least one material selected from the group consisting of:

(A) quicklime;
(B) hydrated lime;
(C) Portland Cement;
(D) Class C fly ash;
(E) cement kiln dust;
(F) lime kiln dust;
(G) Class F fly ash; and
(H) other pozzolans to form a cementitious second mixture;

2.1.2) forming said cementitious second mixture into the shape and size of the desired load-bearing structure; and 2.1.3) causing the shaped and sized second mixture formed in sub-operation (2.1.2) to undergo a pozzolanic reaction to form said load-bearing structure; and said group (2.2) comprising sub-operations of:

2.2.1) mixing said particulate mixture comprising drilling cuttings in a specified proportion with at least one of foamed asphalt and emulsified asphalt to form an asphaltic second mixture;

(2.2.2) forming said asphaltic second mixture into the shape and size of the desired load-bearing structure; and (2.2.3) causing the shaped and sized asphaltic second mixture formed in sub-operation (2.2.2) to form the load-bearing structure by removal from said shaped asphaltic second mixture of a sufficient fraction of the gas dispersed in any foamed asphalt incorporated into said second mixture and of the liquid continuous phase in which any emulsified asphalt incorporated into said shaped second mixture is emulsified.

Any material as described above that is mixed with the particulate mixture comprising drilling cuttings in sub-operation (2.1.1) or (2.2.1) is denoted herein as a "stabilizer." Following are the believed mechanism of stabilization for each stabilizer and the basic advantages and limitations for each of the types of stabilizers listed above, those types of stabilizers listed explicitly above being preferred over other pozzolanic stabilizers.

Quick Lime and Hydrated Lime.

Whether hydrated lime, i.e., $Ca(OH)_2$, or quicklime, i.e., $CaO$, is selected as a source of stabilization, it is believed that hydrated lime is more effective for stabilization. Therefore, if quicklime is selected as the source of stabilization, at an early stage during the formation of the second mixture as described in sub-operations (2.1.1) and (2.2.1) above, the quicklime preferably is transformed to hydrated lime through reaction with adequate quantities of water. This water may derive from the particulate mixture comprising drilling cuttings as described above or may be added separately. Since the gram-molecular weight of $Ca(OH)_2$ is approximately 74 and the gram-molecular weight of $CaO$ is approximately 56, the minimum mass of water required for hydration is 34 percent of the mass of the CaO to be hydrated. Practically, however, hydration, also called "slaking," of quicklime is not usually 100 percent efficient within a reasonable time. Under most conditions, therefore, the mass of the water available for slaking any mass of quicklime used as a stabilizer in a process according to the invention preferably is at least, with increasing preference in the order given, 50, 60, 70, 80, 90, or 99% of the mass of the quicklime.

Lime is believed to stabilize primarily the clay fraction of the first mixture of mud and cuttings to be stabilized with which it is mixed to form a second mixture as described above. Therefore, when lime is an important or the sole component of the stabilizing agent used in a process according to this invention, the particulate mixture comprising drilling cuttings to be stabilized preferably comprises clay as a percentage of its solids content that is at least, with increasing preference in the order given, 2, 4, 6, 8, 10, 12, 15, 20, or 25%. Independently, the particulate mixture comprising drilling cuttings to be stabilized with lime in a process according to the invention preferably has a Plasticity Index (hereinafter usually abbreviated as "PI" and determined according to American Society for Testing and Materials (hereinafter usually abbreviated as "ASTM") Procedure D-4318) that is at least, with increasing preference in the order given, 3, 5, 7, 9, 11, 13, 15, 20, 25, or 30 percent. Lime is believed to react with the clay in the high pH environment created when lime and water are mixed. In this environment, the silica and alumina contents of the clay are believed to become sufficiently soluble, as pozzolans, to react with the calcium and water to form calcium-silicate-hydrates and calcium-aluminate-hydrates that are cementitious products.

(A pozzolan is defined as a high surface area siliceous or alumino-siliceous material that in the presence of an alkaline earth-containing alkali such as lime produces a cementitious reaction.) This postulated reaction, along with calcium exchange on clay surfaces, reduces the plasticity of, improves the workability of, improves the drying and drainage of, and provides a substantial strength gain for, the particulate mixture comprising drilling cuttings to be stabilized.

The major advantages of lime are that: it vastly improves the workability of highly plastic mixtures comprising cuttings to be stabilized; and it reacts slowly enough to allow plenty of mixing time—up to four days. The major limitation is that lime does not react with soils that do not contain a reactive clay fraction. Therefore, lime is not reactive with gravelly and sandy soils without clay. Lime may not be reactive with sandy, silty-sandy, and silty soils without reactive clay. However, combinations of lime and fly ash can be effectively used to stabilize these soils.

Portland Cement.

The basic reactions in stabilization with Portland Cement (hereinafter usually abbreviated as "PC") stabilization are believed to be the cementitious, hydration reaction that occurs when calcium silicates and calcium aluminates present in the Portland Cement hydrate with added water. The strength gain is independent of soil mineralogy, e.g., whether any clay is present in the soil. However, some pozzolanic reaction between lime released during the cementitious reaction and any clay that is present in the particulate mixture comprising drilling cuttings to be stabilized can and is believed to occur. Portland Cement provides workability and strength improvements similar to those achieved with lime. The major differences are that: PC usually works better with low PI, granular soils, whereas lime works better with higher PI, clayey soils; strength gain with PC is quicker than with lime; and PC will usually provide a higher final strength than lime in any structure made by stabilization in a process according to this invention. The faster strength gain can be either an advantage or a disadvantage, depending on circumstance; it can be an advantage in meeting a short construction schedule, but the construction/shaping time is usually limited to four hours after mixing in order to avoid significant strength loss. A second limitation is a greater prevalence of significant shrinkage cracking in structures stabilized with high percentages of PC.

Class C Fly Ash.

Class C fly ash is a non-combustible residue of coal. This residue is composed primarily of high surface area silicates and aluminates and often contains calcium from calcium oxide naturally present in the coal and/or added to abate air pollution by reacting with gaseous oxides of sulfur generated by the combustion of some coal. When water is added to Class C fly ash, any silicates and aluminates in the fly ash that have been fused with calcium oxide are believed to react as with PC to form cementitious products, while the silicates and aluminates that have not previously been fused with lime are believed to react as pozzolans if an outside source of lime is added. Class C fly ash is accordingly believed to stabilize cementitious second mixtures as described above through combined processes of hydration and pozzolanic reactions that result in improved workability of the second mixtures during shaping and sizing and in increased shear strength in the cured structure.

Fly ashes are quite variable and source dependent. Class C fly ash for use in a process according to this invention preferably has the following characteristics, each of these characteristics being independently preferred and combinations of the characteristics being still more preferred, the preference being greater, the greater the number of preferred characteristics combined:

the percentage of the mass of the fly ash retained on a No. 325 sieve preferably is not more than, with increasing preference in the order given, 34, 32, 30, 28, 26, 24, 22, 20, 18, 16, 14, 12, 10, 8, 6, 4, or 2%;

the total content of $SiO_2+Al_2O_3+Fe_2O_3$ preferably constitutes a percentage of the total mass of the fly ash that is at least, with increasing preference in the order given, 50, 60, 65, 70, 75, 80, 85, 90, 95, or 99%;

the total content of sulfur, measured as its stoichiometric equivalent as $SO_3$, preferably is not more than, with increasing preference in the order given, 5.0, 4.0, 3.0, 2.5, 2.0, 1.5, 1.0, 0.5, 0.3, or 0.1%; and the loss on ignition of the fly ash preferably is not more than, with increasing preference in the order given, 10, 8, 6, 4, 2.0, 1.5, 1.0, 0.5, 0.3, or 0.1%.

Class C fly ash is similar to PC in its ability to provide high strength, its ability to provide stabilization even in the absence of clay in the particulate mixture comprising drilling cuttings to be stabilized, and in its fast strength development. The principal advantage of Class C fly ash is that it can be considerably less expensive than PC or lime if available from a source near where a process according to the invention is performed. The principal disadvantage of Class C fly ash is its variability in setting time, which requires more frequent testing than with PC, except in relatively rare instances where a sufficiently large supply of the fly ash with consistent properties is available.

Combinations of Lime and Fly Ash.

Class F fly ash is a more or less pure pozzolan which contains little or no alkaline earth metal content. Lime reacts with Class F ash as it does with clay to produce a pozzolanic reaction which can be of substantial value in strength development in a shaped and sized secondary mixture as described above. Class F ash and lime can be effectively used together to stabilize mixtures of mud and cuttings with a wide range of mineralogical contents ranging from clays to sands and gravels. Since a pozzolan is contributed by the ash, clay is not required to react with the lime.

Like Class C ash, Class F ash is variable from source to source. Class F fly ash for use in a process according to this invention preferably has the following characteristics, each of these characteristics being independently preferred and combinations of the characteristics being still more preferred, the preference being greater the greater the number of preferred characteristics combined:

the percentage of the mass of the fly ash retained on a No. 325 sieve preferably is not more than, with increasing preference in the order given, 34, 32, 30, 28, 26, 24, 22, 20, 18, 16, 14, 12, 10, 8, 6, 4, or 2%;

the total content of $SiO_2+Al_2O_3+Fe_2O_3$ preferably constitutes a percentage of the total mass of the fly ash that is at least, with increasing preference in the order given, 70, 75, 80, 85, 90, 95, or 99%;

the total content of sulfur, measured as its stoichiometric equivalent as $SO_3$, preferably is not more than, with increasing preference in the order given, 5.0, 4.0, 3.0, 2.5, 2.0, 1.5, 1.0, 0.5, 0.3, or 0.1%;

the loss on ignition of the fly ash preferably is not more than, with increasing preference in the order given, 10, 8, 6, 4, 2.0, 1.5, 1.0, 0.5, 0.3, or 0.1%; and the unconfined compressive strength (hereinafter usually abbreviated as "UCS"), measured as described below, preferably is at least, with increasing preference in the order given, 800, 850, 900, 950, 1000, 1050, 1100, 1, 1200, 1250, 1300, 1350, 1400, 1450, or 1500 pounds per square inch (hereinafter usually abbreviated as "psi").

The unconfined compressive strength of the fly ash is measured on samples that have previously been mixed with lime and/or Portland Cement in the same proportion between the fly ash and lime and/or Portland Cement as is intended for the combination to be used in stabilization. Tests on these mixtures are performed in accordance with ASTM Procedure C-593 to determine the UCS value.

Combinations of Class F fly ash and lime have advantages and disadvantages similar to those of lime, except that: the need for reactive clay in the particulate mixture comprising drilling cuttings to be stabilized is removed by using Class F fly ash; the variability of characteristics of all fly ash is introduced; and the method of application can be varied to advantage in some instances: Lime can be added first to clay-containing mixtures, with the fly ash added later. The initial mixing of lime with the clay will reduce plasticity and improve workability while the later addition of fly ash will enhance strength. This may be superior to lime stabilization alone in mixtures of mud and cuttings to be stabilized, which, even though they may contain clay, do not react rapidly enough with lime to produce sufficient pozzolanic strength development for the purpose of a process according to this invention.

Combinations of Class C or Fluidized Bed Fly Ash and Portland Cement.

These combinations are particularly advantageous in two-stage processes according to the invention, in which the fly ash is used as a drier in the first stage and the cement as an activator in the second stage.

Other Cementitious and Pozzolanic Stabilizers.

Besides lime, PC, and fly ash, other cementitious and pozzolanic stabilizers which may be candidates for stabilization in a process according to this invention include cement kiln dust (hereinafter usually abbreviated as "CKD") and lime kiln dust (hereinafter usually abbreviated as "LKD"). These materials are by-products of cement and lime manufacture, respectively. CKD and LKD are similar to a Class C fly ash in that they both contain some self-cementing calcium-silicate (hereinafter usually abbreviated as "CS") and calciumaluminate (hereinafter usually abbreviated as "CA") compounds. However, both types of kiln dust may have considerable free lime, "free lime" being defined for this usage as the total amount of calcium hydroxide and calcium oxide, both measured as their stoichiometric equivalent as CaO, that are present in the material in a form free to react cementitiously with additional silicates and/or aluminates that may be mixed with the material. LKD is generally higher in free lime and lower in CS and CA products than CKD. The only advantage of CKD or LKD over lime, PC, or fly ash is a lower cost. To provide a substantial cost advantage in a process according to this invention, CKD and/or LKD usually must be locally available near the process site. Both CKD and LKD are quite variable.

Asphalt Emulsions and Foams.

Asphalt emulsions consist essentially of fine particles of asphalt emulsified in water. The emulsion is a sufficiently low viscosity liquid to be mixed with a particulate mixture comprising drilling cuttings to be stabilized at normal ambient field temperatures (i.e., from about 0 to 50° C.), whereas a normal unemulsified asphalt would have to be heated to around 300° C. in order to mix intimately with soil or aggregate. The emulsified particles of asphalt preferably have an average particle size (largest linear dimension) that is at least, with increasing preference in the order given, 0.2, 0.5, 0.7, 1.0, 1.2, 1.4, 1.6, 1.8, or 2.0 micrometres (hereinafter usually abbreviated as "m") and independently preferably is not more than, with increasing preference in the order given, 30, 20, 15, 13, 11, 9, 7, or 5 m. Dispersion in water is maintained by using at least one emulsifying agent, the emulsifying-effective moieties of which may have a positive or a negative charge or be electrically neutral. Ordinarily, cationic emulsions (i.e., those in which the emulsified asphalt particles have a positive charge) are preferred for use with alkaline mixtures of mud and cuttings to be stabilized, while anionic emulsions in which the emulsified asphalt particles have a negative charge are preferred if the particulate mixture comprising drilling cuttings to be stabilized are acidic. However, climatic conditions also affect preferences because an anionic emulsion will not normally cure properly in a high humidity environment, and curing of emulsions is very important to their success. Curing involves first properly coating the aggregate or soil with the emulsion and then removing the water in which the asphalt had been dispersed from the asphalt by draining and/or evaporating the water and leaving behind an asphalt coating of the aggregates. Adequate curing occurs when the proper asphalt emulsion is selected and proper construction methods are used to effect aeration of the mixture during mixing. The residual asphalt then coats the aggregate to provide a cohesive "glue" which in turn provides stability and durability to the mixture.

In some circumstances, Asphalt stabilization may be cheaper than chemical stabilization. Asphalt is often preferred for stabilizing relatively rare mixtures of mud and cuttings to be stabilized that have little or no plasticity and/or have such a high organic content that they cannot be stabilized with economically practical amounts of pozzolanic or cementitious materials. Foamed asphalt and emulsified asphalt should produce essentially the same result. However, the technology for the use of foamed asphalt is not widely developed.

A major limitation with asphalt stabilization is that if or when it is desired to recycle a structure made in a process according to this invention with asphalt stabilization to its original or near original state, recycling will usually be more complicated and correspondingly more expensive because of the presence of the organic binder. On the other hand, calcium-based pozzolanic stabilizers can be recycled to a near virgin state by pulverization and mixing. The material will retain a relatively high pH, between about 8 and 11, but this can be reduced through dilution (mixing with virgin soil) if necessary. If the initial pH is near the higher end of this range, the pH will even be spontaneously reduced, at least in well-aerated parts of the recycled material, by gradual conversion of more alkaline calcium-containing substances to calcium carbonate by reaction with atmospheric carbon dioxide.

Because of the highly variable nature of the particulate mixtures comprising drilling cuttings to be stabilized and of some of the stabilizers used (the fly ashes and kiln dusts), the preferred amounts of stabilizers can be explicitly specified herein only in rather broad terms, as shown in Table 1 below for the most important and preferred single and combination stabilizers. However, with minimal experimentation that is well within ordinary skill in the art, considerably narrower preferences for each particular instance can be readily determined by one of the testing protocols set forth below. The most desirable stabilizer(s) to be tested initially can be readily determined by those skilled in the art by consideration of the advantages and disadvantages of the various stabilizers as described above, the required civil engineering properties of the load-bearing structure to be made in a process according to the 'invention, and the costs of the various stabilizers at the site of the fabrication of the structure.

sity and often strength. For this reason, it is necessary to screen the cuttings for the presence of soluble sulfates. If soluble sulfates are found to be less than or equal to 3 parts per thousand by mass of the solids content of the particulate mixture comprising drilling cuttings to be stabilized, this unit of concentration being hereinafter usually abbreviated as "ppt," there is no significant risk of these adverse effects from sulfates during stabilization. (The concentration of sulfates preferably should be determined on the basis of Texas Department of Transportation Test Methods TEX-620-J and TEX-619-J. The partitioning of soluble sulfates from the cuttings that is part of these test procedures preferably is done with ten parts water to one part soil.) If soluble sulfates are present in a higher concentration than 3 ppt, there is some risk of such adverse effects. Nevertheless, a process according to the

TABLE 1

Broad Preferences for Amounts of Preferred Stabilizers to be Used

| Stabilizer | Preferred Amount of Stabilizer, as a Percentage of Solids in the Stabilizer to Solids in the Particulate Mixture Comprising Drilling Cuttings to be Stabilized |
| --- | --- |
| Portland Cement (as the sole stabilizer) | At least, with increasing preference in the order given, 0.5, 1.0, 1.5, 2.0, 2.5, or 2.9% and independently preferably not more than, with increasing preference in the order given, 15, 12, 10, 8, or 6.0% |
| Lime (as the sole stabilizer) | At least, with increasing preference in the order given, 1.0, 2.0, 2.5, 3.0, 3.5, or 4.0% and independently preferably not more than, with increasing preference in the order given, 20, 15, 12, 10, or 8% |
| Lime and fly ash (as the sole stabilizers) | Lime that is at least, with increasing preference in the order given, 0.2, 0.5, 0.8, 1.0, 1.2, 1.4, 1.6, 1.8, or 2.0% and independently preferably is not ore than, with increasing preference in the order given, 9, 7, 5, or 3%; fly ash that is at least, with increasing preference in the order given, 0.2, 0.5, 0.8, 1.0, 1.2, 1.4, 1.6, 1.8, or 2.0% and independently preferably is not more than, with increasing preference in the order given, 20, 17, 14, 12, 10, 8, or 6%; and, independently, a ratio of fly ash to lime that is at least, with increasing preference in the order given, 0.3:1.00, 0.5:1.00, 0.7:1.00 or 0.9:1.00 and independently preferably is not more than, with increasing preference in the order given, 5:1.00, 3.0:1.00, 2.5:1.00, or 2.01:100 |
| Class C and/or fluidized bed fly ash and Portland Cement (as the sole stabilizers) | Fly ash that is at least with increasing preference in the order given, 0.2, 0.5, 0.8, 1.2, 1.6. 2.0, 2.4, 2.8, 3.2, 3.6, 4.0, 4.4, or 4.8% and independently preferably is not more than, with increasing preference in the order given, 50, 35, 30, 25, or 20, 17, 14, 11, or 9%: Portland Cement that is at least, with increasing preference in the order given, 0.5, 0.8, 1.0, 1.2, 1.4, 1.6, 1.8, 2.0, 2.2, 2.4, 2.6, or 2.8% and independently preferably is not more than, with increasing preference in the order given, 15, 10, 8.5, 8.0, 7.5, 7.0, or 6.5%; and, independently, a ratio of fly ash to cement that is at least, with increasing preference in the order given, 0.10:1.00, 0.20:1.00, 0.30:1.00, 0.35:1.00, 0.40:1.00, or 0.45:1.00 and independently preferably is not more than, with increasing preference in the order given, 30, 25, 20, 15, or 10% |
| Class C fly ash, lime kiln dust, and/or cement kiln dust (as the sole stabilizer(s)) | At least, with increasing preference in the order given, 0.5, 1.0, 1.5, 2.0, 2.5, or 3.0% and independently preferably not more than, with increasing preference in the order given, 30, 25, 20, 15, or 10% |
| Asphalt, emulsified or foamed | At least, with increasing preference in the order given, 0.5, 1.0, 1.5, 2.0, 2.5, or 3.0% and independently preferably not more than, with increasing preference in the order given, 25, 20, 15, 12, 10, or 8% |

Test Protocols.
Preliminary Tests—Visual Evaluation and Concentrations of Interfering Constituents.

The major objectives of visual evaluation are to estimate the moisture content of the particulate mixture comprising drilling cuttings to be stabilized, this moisture content being normally quite high when a mud with an aqueous liquid continuous phase is used, and to determine the presence or absence in the particulate mixture comprising drilling cuttings to be stabilized of any foreign, non-soil-like material such as organics, salt crystals, especially sulfate salts, and/or the like. Thus, the visual identification screens the material for any constituents that are unusual and/or require special stabilization strategies.

Sulfates can interfere with pozzolanic reactions and cementitious reactions when calcium-based stabilizers are used, causing a severely expansive reaction and loss of deninvention can still be used to stabilize high sulfate mixtures. For example, a highly sulfate tolerant type of Portland Cement can be used. Additional details on this and other methods of coping with high sulfate content soil and/or rock are given in Little, "The Effect of Sulfates on Lime-Soil Interactions" in *Handbook for Stabilization of Pavement Subgrades and Base Courses with Lime* (Candle-Hunt Publishing Company, Dubuque, Iowa, 1995), pp. 51-52 and references cited therein, and in Searcher, S. L. and Little, D. N., "Microstructural Stability of Sulfate-Contaminated Crushed Concrete Treated with Cementitious Materials," 1999 Annual Meeting of the Transportation Research Board, all of which, except for any part which may be inconsistent with any explicit statement herein, are hereby incorporated herein by reference.

It is also known that organic material in excess of one percent by weight may be deleterious to pozzolanic and cementitious reactions in calcium-based stabilizers. If organics are present in levels that interfere with calcium-based stabilization, they will prevent strength development. Therefore, the simplest way to evaluate the effect of organics is to assess the rate and level of strength gain, a test that is preferred for other purposes in any event and is described below. However, even though fairly high concentrations of organic material may be tolerated in the particulate mixture comprising drilling cuttings provided in operation (1) as described above of a process according to this invention, they will require larger amounts of calcium-based stabilizer, and therefore be more expensive to treat, whenever calcium-based stabilizers are used. Accordingly, the concentration of organic material in the particulate mixture comprising drilling cuttings provided in operation (1) as described above of a process according to this invention that employs group (2.1) of sub-operations as described above preferably does not exceed, with increasing preference in the order given, 15, 13, 11, 9, 7, 5, 3, or 1% by mass of said particulate mixture comprising drilling cuttings.

If a mixture desired to be treated according to the invention contains too much of sulfate, organic material, or any other constituent that interferes with attaining the desired degree of stabilization, it may nevertheless be treated by a process according to this invention by diluting the initially unsuitable mixture with other sources of particulate rock and/or soil in sufficient quantity to bring the concentrations of interfering material to an adequately low level in the diluted mixture.

One of the most common "interfering constituents" of a mixture to be treated in a process according to this invention is water from aqueous based drilling muds. This particular constituent, when present in a mixture desired to be utilized in a process according to the invention, is rarely, if ever, preferably reduced in concentration by dilution with another source of soil and/or rock. Instead, any large excess of water is preferably separated from the mixture by a less expensive technique, such as allowing the suspensions to settle and drawing off accumulated water from above the settled bed of solids, spreading the wet mixture over a large outdoor area to promote evaporation of the water, mixing with a solid drying agent, or the like. A particularly preferred technique, when the concentration of water in the mixture and the nature of the soil and/or rock to be treated are suitable, is to utilize a relatively inexpensive drying agent, such as fly ash and/or kiln dust that also has a stabilizing effect as described above. Any such material added should be regarded as part of the stabilizer when the amount of stabilizer is selected along the guidelines in Table 1. This technique is particularly advantageous when mixtures of lime with fly ash and/or kiln dust are to be used as the preponderant stabilizer, because the lime can be added at a later stage of mixing, when it is not so readily bound by excessive amounts of water in the mixture to be stabilized and thereby prevented, or at least delayed, from promoting desired pozzolanic stabilization reactions.

Mixture of Cuttings with Other Sources of Particulate Rock and/or Soil for Purposes Other than Dilution of Interfering Constituents.

Dilution of cuttings with other sources of particulate soil and/or rock is a very useful supplemental technique in a process according to the invention in many instances, even when no dilution is required to reduce the concentrations of interfering substances. For example, suitable soil is often available at very low cost in the vicinity of a site where a structure is to be built by a process according to the invention. In such an instance, the cost of such a structure can often be considerably reduced by mixing some low cost soil with the cuttings, because most naturally formed soils will need less stabilizer per unit volume than most cuttings to be used in a process according to the invention, and the stabilizer is usually more costly than either cuttings or natural soil. Furthermore, a mixture of natural soil and cuttings often forms a stronger structure in a process according to the invention than could be obtained from stabilizing nearby natural soil alone with the same amount of stabilizer. Still further, of course, one object of the invention is to convert drilling cuttings to useful structures, particularly when such conversion will reduce potential liability for environmental pollution by the cuttings. Accordingly, it is preferred that particulate rock and/or soil produced by drilling constitute at least, with increasing preference in the order given, 10, 20, 30, 40, 50, 60, 70, 80, or 90% by mass of the particulate mixture comprising drilling cuttings provided in operation (1) as described above of a process according to this invention, unless the use of such a high fraction of cuttings leads to results inconsistent with other preferences expressed herein for characteristics of the finished structures built by a process according to the invention. (For example, the use of cuttings and stabilizer only in a structure built by a process according to the invention could in some cases result in a structure more susceptible to cracking or other deterioration during aging of the structure than if some other source of particulate rock and/or soil were incorporated into the structure.)

Alternatively or additionally, the fraction of cuttings in the particulate mixture comprising drilling cuttings provided in operation (1) as described above of a process according to this invention preferably is such that the unconfined compressive strength of a structure built by a process according to the invention is greater by at least, with increasing preference in the order given, 3, 6, 9, 12, 15, 18, 21, 24, 27, or 30% than the unconfined compressive strength of a reference structure built by a process that is identical, except that all of the cuttings included in the particulate mixture comprising drilling cuttings provided in operation (1) as described above for the process according to this invention are substituted by an equal volume of the constituents other than cuttings that are present in said particulate mixture.

Lime and/or Hydrated Lime Stabilization.

The degree of stabilization normally desired requires that if lime is the sole or greatly predominant stabilizer, a sufficient amount of lime be added not only to reduce plasticity of clay fines (improve workability) but also to achieve a substantial pozzolanic reaction between clay fines and hydrated lime. This test protocol ensures that an appropriate amount of lime is added to achieve the desired engineering properties.

Step 1: Determine the pH of mixtures of the particulate mixture comprising drilling cuttings to be stabilized with lime in amounts varying in $Ca(OH)_2$ content from 0 to 10 percent. Select a target lime content in accordance with ASTM C-977.

Step 2: Prepare samples according to ASTM D-698 to determine a predicted optimum moisture content for samples with the target percentage of hydrated lime determined in Step 1, with at least one of 1.0 and 2.0 percent below, and with at least one of 1.0 and 102.0 percent above the target lime content determined in Step 1. Samples should be intimately mixed with the specific type of lime and/or hydrated lime intended for use in a process according to this invention and allowed to mellow for two hours prior to compaction.

Step 3: Fabricate three samples at and/or within 2% of the predicted optimum 10 moisture content determined in Step 2 for each trial PC content. Condition the samples at 100 percent relative humidity and at a temperature of 40° C. (The approximate 100 percent relative humidity environment is difficult to achieve in many high temperature chambers. In order to maintain the level of moisture required for pozzolanic reaction and cementitious reaction, it is advisable to wrap the sample in plastic and then to place the sample with approximately 10 grams of water in a readily sealable and unsealable moisture-proof plastic bag.)

Step 4: Determine the UCS of the samples prepared in Step 3 after these samples have been compacted in accordance with ASTM D-698. ASTM Procedure D-5102 is used to determine UCS. The test should be performed on the standard-sized samples used in compaction density evaluation. Prior to UCS testing, the samples are wrapped in a fibrous geofabric capable of transporting moisture along the circumference of the sample, placed on a porous stone covered to the top with water, and allowed to absorb moisture through capillary soak for a period of 24 hours.

Step 5: Plot the compressive strengths of the three samples at each of the three lime contents determined in Step 4 on a chart of compressive strength versus stabilizer content. Select the lime content that provides both the highest compressive strength and an acceptable compressive strength based on the section below titled, "Target Engineering Properties and Structural Thickness Requirements."

Portland Cement Stabilization.

Step 1: Select three trial PC contents based on Table 1. If these stabilizer contents do not provide acceptable strength, then additional trials may be made.

Step 2: Prepare samples according to ASTM D-698 to determine a predicted optimum moisture content for a sample with each PC percentage selected in Step 1. The particulate mixture comprising drilling cuttings to be stabilized should be intimately mixed with PC and then immediately compacted.

Step 3: Fabricate three samples at and/or within 2% of the predicted optimum moisture content determined in Step 2 for each trial PC content. Cure the samples by placing them in a sealed plastic bag and place the bagged samples in a curing room at a temperature of 25° C. for 7 days.

Step 4: Determine the UCS of the samples fabricated in Step 3 by the same procedures as for Step 4 under the heading "Lime and/or Hydrated Lime Stabilization" above.

Step 5: Plot the compressive strengths of the three samples at each of the three PC contents on a chart of compressive strength versus stabilizer content. Select the PC content in the same manner as used for selecting lime content in Step 5 under the heading "Lime and/or Hydrated Lime Stabilization" above.

Class C Fly Ash, Lime Kiln Dust, and/or Cement Kiln Dust Stabilization.

Step 1: Select three trial ash and/or dust contents from Table 1. If these stabilizer contents are not satisfactory, then additional testing may be required.

Step 2: Prepare samples according to ASTM D-698 to determine a predicted optimum moisture content for a sample with each percentage of ash and/or dust selected in Step 1. Samples should be intimately mixed with the ash and/or dust and then compacted immediately.

Step 3: Fabricate three samples at and/or within 2% of the predicted optimum moisture content determined in Step 2 for each trial ash and/or dust content. Cure the samples by placing them in a sealed plastic bag and placing the bagged samples in a curing room at a temperature of 25° C. for 7 days.

Step 4: Determine the UCS of the samples cured in Step 3 by the same procedures as for Step 4 under the heading "Lime and/or Hydrated Lime Stabilization" above.

Step 5: Plot the compressive strengths of the three samples at each of the three ash and/or dust contents on a chart of compressive strength versus stabilizer content. Select the ash and/or dust content in the same manner as used for selecting lime content in Step 5 under the heading "Lime and/or Hydrated Lime Stabilization" above.

Stabilization with Combinations of Portland Cement, Lime, and/or Hydrated Lime with Fly Ash, Cement Kiln Dust, and/or Lime Kiln Dust.

1. Single State Type.

Step 1.1: Based on Table 1, determine target contents for each of the lime group and the ash/dust group. The combinations of lime and Class F fly ash in Table 1 are based on the amount of fly ash required to provide a pozzolan source and, secondly, the amount of lime required to sufficiently activate the Class F ash. However, if more plastic cuttings are encountered and do not react with the lime group alone to provide sufficient strength gain, then the lime group content may have to be increased above that listed in Table 1 in order to modify the clay content of the particulate mixture comprising drilling cuttings to be stabilized prior to activating the pozzolanic reaction with the Class F ash.

Step 1.2: Prepare samples according to ASTM D-698 to determine a predicted optimum moisture content for a sample with each combination of lime group and ash/dust group content selected in Step 1. Samples should be intimately mixed with both the lime group and the ash/dust group stabilizers. The stabilizers of both groups may be added at the same time unless the plasticity index of the cuttings as determined according to ASTM Procedure D-4318 exceeds 15 percent. In that instance, the lime group stabilizer should be mixed first with the particulate mixture comprising drilling cuttings to be stabilized, immediately followed by the ash/dust group stabilizer.

Step 1.3: Fabricate three samples at and/or within 2% of the predicted optimum moisture content determined in Step 2 for each trial content combination. Cure the samples by placing them in a sealed plastic bag and place the bagged samples in an oven or curing room at a temperature of 40° C. for 7 days.

Step 1.4: Determine the unconfined compressive strength (UCS) of the samples cured in Step 3 by the same procedures as for Step 4 under the heading "Lime and/or Hydrated Lime Stabilization" above.

Step 1.5: Plot the compressive strengths of the three samples at each of the three contents combinations on a chart of compressive strength versus stabilizer content. Select the lime group and ash/dust group contents in the same manner as used for selecting lime content in Step 5 under the heading "Lime and/or Hydrated Lime Stabilization" above.

2. Two Stage Type.

Step 2.1: The purpose of the initial step is to select a drying and pre-stabilization agent (hereinafter usually abbreviated as "DPSA") that has the capability of drying the drill cuttings to a level of acceptable workability and of initiating the stabilization process. Typical candidates for DPSA include fly ash, lime kiln dust, cement kiln dust, and quicklime. The DPSA candidates should be able to produce a high enough pH to initiate a pozzolanic reaction between silica and alumina in the cuttings and calcium from the DPSA. This pozzolanic reaction accomplishes part of the drying process and begins the strength gain process. Proper selection of the DPSA permits successful drying and stabilization. Within these constraints, the selection of the appropriate DPSA is largely based on site-specific availability and cost effectiveness.

Step 2.2: Mix trial amounts of the candidate DPSA with the cuttings in their natural moisture state. The mixing process should simulate the level of preliminary mixing that can be achieved in the field. A reasonable process is to mix the DPSA with the cuttings in a mixing bowl with a spatula. Then allow the mixture of cuttings and DPSA to dry overnight and test the resulting moisture content. A satisfactory level of drying is achieved when the cuttings can be molded into a cohesive mass in the palm of a normal human hand. (This is typically at about three to five percentage points above optimum moisture for compaction according to American Association of State Highway and Transportation Officials Procedure T-99, if some soil is to be blended with the mixture in the final structure to be built according to the invention.)

Step 2.2': (Used only when soil is to be added to the mixture in the final structure to be built according to the invention.) Blend samples of the dried mixture from step 2.2 with several proportions of the soil to be used. Determine the moisture density relationship of the blend of cuttings, DPSA, and soil. A reasonable moisture-density relationship according to American Association of State Highway and Transportation Officials Procedure T-99 normally should be achieved with about five samples.

Step 2.3: Determine the type and amount of second stage stabilizer, alternatively denoted as "activator," to be used. The activator can be the same material as the DPSA, but typically will be Portland Cement or lime (calcium oxide or calcium hydroxide). The primary role of the activator is to react with the soil and/or DPSA pozzolans to complete the pozzolanic reaction and to augment the pozzolanic reaction by a hydration cementitious reaction as required to achieve the desired compressive strength. The activator not only completes the stabilization process but also completes the drying process.

Step 2.4: Determine the amount of the activator selected in Step 2.3 that is needed to achieve the required unconfined compressive strength. The determination can usually be effectively begun by molding three samples at the predicted optimum moisture content determined in step 2.2 (including 2.2' if this step is used) and three additional samples at each of one percent less than optimum and one percent in excess of optimum. Nine samples according to this procedure should be made for each of the mixtures without activator and for activator contents of each of 3.0, 5.0, and 7.0 percent. The UCS of these samples is tested after curing and conditioning as described for Steps 3 and 4 under the heading "Lime and/or Hydrated Lime Stabilization" above.

Step 2.5: Select an appropriate mixture design based on the results of UCS Testing in Step 2.4. The UCS is used in a layered elastic model of the structure to be built according to the invention as described in the section of this description below after the heading "Target Engineering Properties and Structural Thickness Requirements."

Stabilization with Asphalt (Emulsified and/or Foamed).

Step 1: Select a slow setting (hereinafter usually abbreviated as "SS") emulsion for cuttings having greater than 15 percent by mass of material passing a sieve with openings 0.075 millimeter(s) (hereinafter usually abbreviated as "mm"). Otherwise, select a medium setting (hereinafter usually abbreviated as "MS") emulsion. (A determination of whether an anionic or cationic emulsion should be used is based on coating and adhesion tests described in subsequent steps).

Step 2: Determine a trial emulsion and/or foam content for the particulate mixture comprising drilling cuttings to be stabilized as follows:

$$\% \text{ emulsion and/or foam} = [(0.06 \times B) + (0.01 \times C) \times 100]/A,$$

where A is percent residue by ASTM D-244, B is percent of dried particulate mixture comprising drilling cuttings to be stabilized that passes a No. 4 sieve, and C is (100−B).

Step 3: The trial emulsion and/or foam content determined in Step 2 is combined with the particulate mixture comprising drilling cuttings to be stabilized, corrected to a dry weight, and formed into a coating, which is visually estimated as satisfactory or unsatisfactory for its intended use of the mix. The procedure for forming the coating consists of the following operations: (3.1) Determine the moisture content of a representative particulate mixture comprising drilling cuttings to be stabilized; (3.2) mix in water by hand for 10 seconds or until visually uniformly dispersed, the amount of water being determined by visual inspection of the mixture; (3) add the selected weight of the trial emulsion and/or foam content to the moist aggregate at the anticipated use temperature and mix vigorously by hand for 60 seconds or until sufficient dispersion has occurred throughout the mixture; and (4) place the mixture on a flat surface and visually estimate the degree of coating.

Step 4: Prepare three or more specimens each at a minimum of three different emulsion and/or foam contents. If the mixture in the coating test of Step 3 appears satisfactory, use one specimen with the same emulsion and/or foam concentration as used for Step 3, with one other specimen below and one other specimen above the trial emulsion and/or foam content. If the mixture in the coating test of Step 3 appears to be dry, use one specimen with the foam and/or emulsion content used for Step 3 and increase the foam and/or emulsion content for each of the other two specimens. Conversely, if the mixture in the coating test of Step 3 appears too wet, reduce the foam and/or emulsion content for the second and third specimens. (A normal difference between the emulsion and/or foam contents is one percent, or a residual asphalt content difference of 0.65 percent for an emulsion and/or foam with a 65 percent residual content.)

Step 5: Determine adhesion by the following sequence of operations: (1) Cure a 100 gram portion of the mix from Step 4 in a shallow container for 24 hours in a forced draft oven at 60° C.; (2) put the oven-cured mix in a 600 milliliter (hereinafter usually abbreviated as "ml") size beaker containing 400 ml of boiling distilled water; 3) bring to a boil again, and maintain boiling and stir at one revolution per second; (4) pour off water and place the mix on a piece of white absorbent paper; and (5) after the mix has dried, visually evaluate the amount of retained asphalt coating. If satisfactory, continue the mix design or if not acceptable, then the amount of emulsion and/or foam used should be modified or another grade selected.

Step 6: Compact a freshly prepared specimen of the most satisfactory mixture(s) from Step 5 according to ASTM D 59 or D 1560. (Aeration or drying of a dense-graded mixture is often required prior to specimen compaction. If the total liquid volume exceeds the voids in the mineral aggregate plus any absorbed liquid volume, proper compaction cannot be achieved.)

Step 7: Determine volumetrics and stability of the compacted mixtures. Volumetrics such as air voids, voids filled with bitumen, and voids in the mineral aggregate, can be determined by properly accounting for moisture and following appropriate ASTM testing procedures, including D-70, D-1188, D-2726, and D-3203. Marshall stability and flow should be determined following the procedures of ASTM D-1559 beginning at paragraph five (Procedure), except that the compacted specimens preferably are placed in an air bath for a minimum of two hours at the test temperature of 25° C. (±1° C.). A stability value of 2,224 N or greater has been found to be satisfactory for most pavements with low to moderate traffic volume. Hveem stability preferably is determined following ASTM D-1560 (paragraphs four through nine), except that the compacted specimens preferably are placed in an air bath for a minimum of two hours at the test temperature of 25° C. (±1° C.). A stability value of 30 or greater has been found to be satisfactory for most pavements with low to moderate traffic volume.

Target Engineering Properties and Structural Thickness Requirements.

The combination of thickness and physical properties, e.g., stiffness and strength, of the stabilized particulate mixture comprising drilling cuttings must be capable of supporting all of the continuous and/or varying loads applied to it during its designed use.

For example, if the structure to be built by a process according to the invention is a drilling pad, the pad must be able to support heavy equipment hauled in and out of the site during the drilling operations. However, stiffness and strength values far greater than those needed are disadvantageous for at least two reasons: very high stiffness and strength values result in greater susceptibility to cracking and similar forms of brittle deterioration that can substantially shorten the useful life of a structure, and achieving very high strength and stiffness usually requires considerably larger fractions of stabilizer in a structure, thereby increasing its cost.

To assess the required engineering properties and thickness combinations required of the stabilized particulate mixture comprising drilling cuttings, a layered elastic structural evaluation is preferred. In this type of evaluation, the structure to be built is modeled as a succession of layers. Each layer is modeled by a modulus and a Poisson's ratio with an assigned thickness. A load configuration is modeled to simulate the critical traffic applied to the structure and includes consideration of the wheel load, load geometries, and tire contact pressure. The layered elastic model (hereinafter usually abbreviated as "LEM") calculates stresses and strains within the pavement system. Stresses and strains at critical points, e.g., compressive strains at the top of the natural subgrade, and shearing stresses within the structural layer, are calculated and compared to criteria used to assess performance in terms of the number of applications of such a design load that the structure can withstand.

A factorial LEM analysis was performed considering the effects of four variables: the number of load applications, subgrade strength, structural layer thickness, and structural layer strength and modulus. The design load was defined as an 18,000 pound single axle load, which is expected to result in a structure that is fully satisfactorily strong, stiff, and durable for a normal deep drilling pad or lease road needed in connection with deep drilling. Table 2 illustrates some results of the factorial analysis. "E" in Table 2 represents the resilient modulus. The value for E given in Table 2 was calculated by the most conservative of established empirical correlations between resilient modulus and UCS, specifically that:

E(in thousands of psi)0.124(UCS{in PSI})+9.98.

The unit "thousands of psi" is hereinafter usually abbreviated as "kpsi."

The UCS values shown in Table 2 are for samples that have been moisture-conditioned for 7 days. If unconditioned samples are used instead, the UCS values should be 100 psi higher than those shown in Table 2.

The control in Table 2 is a compacted crushed limestone gravel base with a UCS value of 45 psi and a modulus that is expected to be within a range from 13 to 18 kpsi, based on typical properties of unbound aggregate bases under a stress representative of that on a structural pad or a lease road.

A considerably higher UCS value than the maximum value of 300 psi shown in Table 2 can be achieved by using high stabilizer percentages. However, the 300 psi value is considered to be the upper limit practically required of most stabilized bases subjected to moisture conditioning that simulates the deep drilling field environment. In fact, if a stabilized layer can maintain at least 100 psi following moisture conditioning, it normally should provide adequate field durability when used in the thicknesses shown for that UCS value in Table 2. However, if the structure is being built in an area with a continuously high water table or an area where there are large seasonal fluctuations in water table, a higher UCS value may be advantageous to prevent deterioration from these environmental influences. In a normal deep drilling field environment, however, for the reasons given above, the UCS values obtained after 7 days of aging of the actual mixture of materials to be used in building a structure by a process according to this invention preferably does not exceed the value given in Table 2 for the structure thickness and subgrade strength values as shown in Table 2 by a percentage of said value given in Table 2 that is more than, with increasing preference in the order given, 300, 250, 200, 190, 180, 170, 160, 150, 140, 130, 120, 110, 100, 90, 80, 70, 60, 50, 40, 30, or 20 percent. For example, if the subgrade strength is at least 5,000 psi but less than 10,000 psi and the thickness of the structure to be built is 16 inches, the conditioned UCS value preferably is at least 100 psi but need not be more than 120 psi, but if the thickness is only 10 inches, the conditioned UCS value preferably is at least 300 psi and need not be more than 360 psi.

TABLE 2

Factors and Values Thereof Considered in Factorial Analysis and Resulting Thickness Requirements

| Subgrade Strength | Strength and Stiffness of the Stabilized Particulate Mixture Comprising Particles of "Control" or of Soil, Rock, or Both Rock and Soil | Recommended Thickness, inches |
|---|---|---|
| Soft ($E$subgrade = 5.0 kpsi) | Control (E = 13-18 kpsi) | 18 |
| | UCS = 100 psi (E = 22 kpsi) | 16 |
| | UCS = 200 psi (E = 35 kpsi) | 12 |
| | UCS = 300 psi (E = 47 kpsi) | 10 |
| Moderate ($E$subgrade = 10.0 kpsi) | Control (E = 13-18 kpsi) | 13 |
| | UCS = 100 psi (E = 22 kpsi) | 12 |
| | UCS = 200 psi (E = 35 kpsi) | 9 |
| | UCS = 300 psi (E = 47 kpsi) | 8 |
| Strong ($E$subgrade = 15.0 kpsi) | Control (E = 12.6-18 kpsi) | 8 |
| | UCS = 100 psi (E = 22 kpsi) | 8 |
| | UCS = 200 psi (E = 35 kpsi) | 8 |
| | UCS = 300 psi (E = 47 kpsi) | 8 |

The thickness values recommended in Table 2 can accommodate at least 10,000 applications of the design load with less than 1 inch depth of rutting. (These values were compared to those found using the U.S. Army Corps of Engineers granular base rutting model and found to be at least as large as those recommended by that model.)

The thicknesses in Table 2 are exact only for the specified purposes and conditions. Each instance of use of a process according to this invention should be evaluated by the methods outlined above using the actual stabilizer(s) and particulate mixture comprising drilling cuttings to be stabilized and the particular strength, stiffness, and durability requirements of the actual structure to be built.

In a particularly preferred embodiment of the invention, the mixture comprising drilling cuttings provided in operation (1) of a process according to the invention as described above is a mixture that has been produced by drilling through the surface of the earth to form a borehole by a process comprising sub-operations of:

1.1) Providing drilling means, drilling driving means that cause the drilling means to operate at the bottom of said borehole, and drilling mud; and 1.2) Causing said drilling driving means to drive said drilling means while said drilling mud flows into and out of said borehole through separate passage-ways disposed so as to insure that mud pumped into the borehole must reach the near vicinity of the drilling means that is deepening, widening, and/or otherwise increasing the volume of said borehole before the mud can enter any passageway through which a mixture of mud and cuttings flows out of the borehole during drilling, said mixture of mud and cuttings, optionally after removal therefrom of all or part of the constituents of said mixture that are not cuttings and/or additions thereto of other particulate material, constituting said mixture that has been produced by drilling through the surface of the earth to form a borehole.

The invention may be further appreciated by consideration of the following examples, at least some, but not necessarily all, of which are according to the invention.

EXAMPLES OF DEVELOPMENT OF STRUCTURAL STRENGTH IN MIXTURES INCORPORATING DRILLING CUTTINGS

Example 1

In this example, the cuttings used were obtained during drilling in the vicinity of Buffalo in Freestone County, Tex., using water-based drilling mud. The native soil in this area is described as follows by government sources: "Edge Fine Sandy Loam, 5 to 12% Slopes. The Edge Series consists of deep over siltstone, well drained, very slowly permeable upland soils. The surface to 11 inches is fine sandy loam. The subsoil is reddish and clay loam 11 to 29 inches."

Cuttings from drilling through this soil with a water-based drilling mud were collected in a waste pit on the drilling site and allowed to settle for a period of at least several months. Settled and moist sediment of this type was used as the cuttings to be stabilized during this example. These cuttings were determined by ASTM D 4318 to have an Atterberg Liquid Limit of 25, Plastic Limit of 16, and Plasticity Index of 9, while the native surface soil was independently determined to have an Atterberg Liquid Limit of 18 and Plastic Limit of 19.

Based on the principles given above, concentrations of 3, 5, and 7% of Type 1 Portland Cement and a concentration of 10% of Class C Fly Ash were chosen as candidate stabilizers for a mixture of the selected cuttings with twice its own mass of the native soil taken from the top 12 inches thereof. In accordance with the Test Protocols given above for both these stabilizers, a predicted optimum moisture content for each mixture was determined according to ASTM D 698 for each mixture, with the results shown in Table 3 below.

TABLE 3

| Concentration and Type of Stabilizer | Predicted Optimum Moisture Percent |
|---|---|
| 3% Cement | 11.4 |
| 5% Cement | 10.6 |
| 7% Cement | 11.0 |
| 10% Class C Fly Ash | 9.6 |

Samples incorporating the predicted optimum moisture percent and moisture percents differing from the predicted optimum by 2% both greater and less were then prepared and cured as described above in the test protocols. The UCS values for these samples are shown in Table 4 below.

TABLE 4

| Concentration and Type of Stabilizer | UCS Value in psi with Percents of Moisture: | | |
|---|---|---|---|
| | Predicted Optimum −2 | Predicted Optimum | Predicted Optimum +2 |
| 3% Cement | 159 | 181 | 136 |
| 5% Cement | 196 | 336 | 219 |
| 7% Cement | 243 | 389 | 358 |
| 10% Class C Fly Ash | 28 | 54 | 40 |

In this instance, a UCS value expected to be satisfactory for very heavy duty service is readily achieved with 5% or 7% cement and a value satisfactory for slightly lighter duty service was achieved with 3% cement. The particular type of Class C Fly Ash used was not as effective in achieving strength gain as the cement.

Example 2

In this example, the cuttings used were obtained during drilling in Midland County, Tex., using water-based drilling mud. The native soil in this area is of two types, which are described as follows by government sources: "Miles Loamy Fine Sand, 0 to 3° A Slopes . . . . The Miles Series consists of deep, moderately drained soils on uplands . . . [From] 0 to 14 inches [the soil is/has] reddish-brown (5YR 5/4) loamy fine sand, dark reddish-brown (5YR 3/4) when moist; weak, very fine, subangular blocky structure; soft, very friable; common roots; neutral; gradual, smooth boundary" and "Sharvana Fine Sandy Loam, 0 to 3% Slopes. The Sharvana [S]eries consists of moderately permeable soils on uplands.

These soils are shallow to indurated caliche . . . . In a representative profile the surface layer is reddish-brown fine sandy loam about 6 inches thick. The next layer is reddish-brown sandy clay loam about 8 inches thick." Cuttings from drilling through this soil with a water-based drilling mud were collected in a waste pit on the drilling site and allowed to settle for a period of at least several months. Settled and moist sediment of this type was used as the cuttings to be stabilized for the purpose of this example.

Based on the principles given above, concentrations of 3, 5, and 7% of Type 1 Portland Cement and a concentration of 10% of Class C Fly Ash were chosen as candidate stabilizers for a mixture of the selected cuttings with twice its own mass of the native soil taken from the top 12 inches thereof. In accordance with the Test Protocols given above for both these stabilizers, a predicted optimum moisture content for each mixture was determined according to ASTM D 698 for each mixture, with the results shown in Table 5 below.

TABLE 5

| Concentration and Type of Stabilizer | Predicted Optimum Moisture Percent |
|---|---|
| 3% Cement | 11.0 |
| 5% Cement | 11.5 |
| 7% Cement | 11.0 |
| 10% Class C Fly Ash | 10.5 |

Samples incorporating the predicted optimum moisture percent and moisture percents differing from the predicted optimum by 2% both greater and less were then prepared and cured as described above in the test protocols. The UCS values for these samples are shown in Table 6 below.

TABLE 6

| | UCS Value in psi with Percents of Moisture: | | |
|---|---|---|---|
| Concentration and Type of Stabilizer | Predicted Optimum −2 | Predicted Optimum | Predicted Optimum +2 |
| 3% Cement | 132 | 122 | 80 |
| 5% Cement | 221 | 156 | 127 |
| 7% Cement | 254 | 223 | 161 |
| 10% Class C Fly Ash | 115 | 80 | 63 |

In this instance, a UCS value expected to be satisfactory for very heavy duty service is readily achieved with 5% or 7% cement and a value satisfactory for slightly lighter duty service was achieved with 3% cement. The particular type of Class C Fly Ash used was not quite as effective in achieving strength gain as even the lowest percentage of the cement, but was much more effective than in Example 1.

Examples 3 to 9

In all of these examples, the cuttings used were obtained during drilling at various sites in Latimer County, Okla., using oil-based drilling mud. Cuttings from drilling through these soils with an oil-based drilling mud were passed over a shaker table and through a centrifuge in tandem to separate the cuttings from the drilling mud, which was recycled to drilling. Separated cuttings of this type were used as the cuttings to be stabilized during these examples. These cuttings for Examples 5 to 9 were determined by ASTM D 4318 to have Atterberg Liquid Limits, Plastic Limits, and Plasticity Indices as shown in Table 7 below, while the nearby surface soil was independently determined to have values for the same characteristics at the time of mixing with the cuttings used in the various examples as also shown in Table 7.

TABLE 7

| | | Atterberg Test Values for: | | |
|---|---|---|---|---|
| Example No. | Cuttings or Soil? | Liquid Limit | Plastic Limit | Plasticity Index |
| 5 | Soil | 31 | 22 | 9 |
| | Cuttings | 55 | 45 | 10 |
| 6 | Soil | 56 | 28 | 28 |
| | Cuttings | 31 | 26 | 5 |
| 7 | Soil | 20 | 71 | 3 |
| | Cuttings | 55 | 42 | 13 |
| 8 | Soil | 35 | 20 | 15 |
| | Cuttings | 65 | 50 | 15 |
| 9 | Soil | 24 | 17 | 7 |
| | Cuttings | 48 | 39 | 9 |

Based on the principles given above, concentrations of 3, 5, and 7% of Type 1 Portland Cement and a concentration of a combination of 10% of Class C Fly Ash and 2% of Portland Cement were chosen as candidate stabilizers for the mixtures of the selected cuttings with twice their own masses of the native soil taken from the top 12 inches thereof. In accordance with the Test Protocols given above for both these stabilizers, an estimated optimum moisture content for each mixture was determined according to ASTM D 698 for each mixture, with the results shown in Table 8 below.

TABLE 8

| Example No. | Concentration and/or Type of Stabilizer | Predicted Optimum Moisture Percent |
|---|---|---|
| 3 | 3% Cement only | 18.7 |
| | 5% Cement only | 17.0 |
| | 7% Cement only | 18.4 |
| | Fly Ash + Cement | 18.0 |
| 4 | 3% Cement only | 20.4 |
| | 5% Cement only | 19.5 |
| | 7% Cement only | 19.9 |
| | Fly Ash + Cement | 18.6 |
| 5 | 3% Cement only | 20.5 |
| | 5% Cement only | 19.9 |
| | 7% Cement only | 18.8 |
| | Fly Ash + Cement | 18.6 |
| 6 | 3% Cement only | 18.9 |
| | 5% Cement only | 17.3 |
| | 7% Cement only | 14.0 |
| | Fly Ash + Cement | 9.8 |
| 7 | 3% Cement only | 15.0 |
| | 5% Cement only | 13.6 |
| | 7% Cement only | 14.1 |
| | Fly Ash + Cement | 13.7 |
| 8 | 3% Cement only | 16.0 |
| | 5% Cement only | 18.2 |
| | 7% Cement only | 17.9 |
| | Fly Ash + Cement | 15.5 |
| 9 | 3% Cement only | 14.7 |
| | 5% Cement only | 14.6 |
| | 7% Cement only | 13.5 |
| | Fly Ash + Cement | 12.8 |

Samples incorporating the predicted optimum moisture percent and moisture percents differing from the predicted optimum by 2% both greater and less were then prepared and cured as described above in the test protocols. The UCS values for these samples are shown in Table 9 below.

TABLE 9

| | | UCS Value in psi with Percents of Moisture: | | |
|---|---|---|---|---|
| Example No. | Concentration and/or Type of Stabilizer | Predicted Optimum −2 | Predicted Optimum | Predicted Optimum +2 |
| 3 | 3% Cement only | 73 | 82 | 63 |
| | 5% Cement only | 152 | 113 | 80 |

TABLE 9-continued

| Example No. | Concentration and/or Type of Stabilizer | UCS Value in psi with Percents of Moisture: | | |
|---|---|---|---|---|
| | | Predicted Optimum −2 | Predicted Optimum | Predicted Optimum +2 |
| | 7% Cement only | 215 | 229 | 160 |
| | Fly Ash + Cement | 94 | 87 | 61 |
| 4 | 3% Cement only | 104 | 128 | 93 |
| | 5% Cement only | 128 | 172 | 160 |
| | 7% Cement only | 191 | 226 | 184 |
| | Fly Ash + Cement | 190 | 220 | 200 |
| 5 | 3% Cement only | 92 | 75 | 50 |
| | 5% Cement only | 156 | 104 | 92 |
| | 7% Cement only | 172 | 122 | 119 |
| | Fly Ash + Cement | 44 | 37 | 32 |
| 6 | 3% Cement only | 46 | 53 | 35 |
| | 5% Cement only | 48 | 66 | 72 |
| | 7% Cement only | 89 | 62 | 141 |
| | Fly Ash + Cement | 17 | 33 | 55 |
| 7 | 3% Cement only | 105 | 73 | 60 |
| | 5% Cement only | 218 | 166 | 119 |
| | 7% Cement only | 294 | 189 | 157 |
| | Fly Ash + Cement | 117 | 90 | 57 |
| 8 | 3% Cement only | 84 | 55 | 44 |
| | 5% Cement only | 116 | 97 | 76 |
| | 7% Cement only | 142 | 147 | 101 |
| | Fly Ash + Cement | 140 | 80 | 58 |
| 9 | 3% Cement only | 87 | 59 | 57 |
| | 5% Cement only | 118 | 125 | 82 |
| | 7% Cement only | 172 | 142 | 127 |
| | Fly Ash + Cement | 170 | 109 | 102 |

In most of these instances, a UCS value expected to be satisfactory for moderately heavy duty service is readily achieved with 5% or 7° A) cement. The combination of cement and the particular type of Class C Fly Ash used, along with 3% cement only, was not as effective in achieving strength gain as the cement in most instances, but the combination was nearly as good for Example 4. These results emphasize that the exact materials to be used need to be tested and optimized in order to achieve very highly satisfactory structures.

Examples 10 to 15

In these examples, the cuttings always included some cuttings that had been obtained by drilling with water-based mud. Therefore, in accordance with the preferences indicated above, the processes according to the invention were divided into two stages. In the first stage, the cuttings and any mud of the same type used to produce them that had previously been mixed for storage were mixed with a Class C Fly Ash, a type of stabilizer that is also a relatively inexpensive drying agent, to form a preliminary mixture. In the second stage, the preliminary mixture was itself mixed with soil from within the top 2 feet of naturally occurring soil near the site of the drilling operation that had generated the cuttings and with Type I Portland Cement to form the final mixtures that were conditioned for several days before strength testing as described above. Except for Examples 11, 14, and 15, the nearby surface soil that was used in the immediately previously described mixtures was also mixed with Class C Fly Ash and with at least some of the same fractions of the same type of Portland Cement as had been used to make these immediately previously described mixtures, in order to determine whether the incorporation of cuttings would change the strength values that could be obtained with soil, fly ash, and cement alone. (These mixtures that contained no drilling cuttings are not examples according to the invention.) Table 10 below gives further details of Examples 10-15.

TABLE 10

| | | | % by Mass of All Constituents in Conditioned Mixture Except Portland Cement | | | |
|---|---|---|---|---|---|---|
| Example No. | Location (North Latitude I West Longitude) | Soil Only or Mixture with Cuttings? | Soil | Water-Based Cuttings and Any Mud Mixed with Them in Storage | Oil-Based Cuttings and Any Mud Mixed with Them in Storage | Fly Ash |
| 10 | 30° 36.0' I 91° 30.5' | Soil Mixture | 80 50 | 0 30 | 0 12 | 20 8 |
| 11 | 32° 58.3' I 97° 23.1' | Mixture | 71 | 24 | 0 | 5 |
| 12 | 33° 81' I 97° 22.2' | Soil Mixture | 65 71 | 0 21 | 0 0 | 35 7 |
| 13 | 33° 10.6' I 97° 18.4' | Soil Mixture | 70 71 | 0 22 | 0 0 | 30 7 |
| 14 | 33° 10.0' I 97° 18.2' | Mixture | 71 | 26 | 0 | 3 |
| 15 | 32° 58.3' I 97° 22.5' | Mixture | 72 | 25 | 0 | 4 |

Some of the mixtures as described in Table 10 were then mixed with 3.0, 5.0, and 7.0 percent of their own mass of Type I Portland Cement. The predicted optimum moisture 10 percent values for some of these mixtures were determined in accordance with the procedures specified above. Results are shown in Table 11 below.

TABLE 11

| Example No. | Concentration of Cement | Predicted Optimum Moisture Percent |
|---|---|---|
| 10 | 3% | 22.0 |
| | 5% | 20.9 |
| | 7% | 20.3 |
| 11 | 5% | 24.1 |
| 12 | 5% | 24.2 |
| 13 | 5% | 19.5 |

TABLE 11-continued

| Example No. | Concentration of Cement | Predicted Optimum Moisture Percent |
|---|---|---|
| 14 | 5% | 18.8 |
| 15 | 5% | 23.1 |

Samples incorporating the predicted optimum moisture percent and moisture percents differing from the predicted optimum by 2% both greater and less were then prepared and cured as described above in the test protocols. For Examples 11 through 15, the predicted optimum for a mixture with 5% of cement was used irrespective of the actual percent of cement in the sample tested. The UCS values for these samples are shown in Table 12 below. These values were determined after 7 days of conditioning for Examples 10, 14, and 15 and after 5 days of conditioning for Examples 11 through 13.

In Examples 10 and 12, the mixtures containing cuttings developed substantially greater UCS values under most of the conditions tested than the compared mixtures without cuttings, even though the latter contained more of the fly ash stabilizer.

TABLE 12

| Example No. | Concentration of Cement | Cuttings Present in Conditioned Mixture? | UCS Value in psi with Percents of Moisture: | | |
|---|---|---|---|---|---|
| | | | Predicted Optimum − 2 | Predicted Optimum | Predicted Optimum + 2 |
| 10 | 3% | No | 109 | 77 | 55 |
|  |  | Yes | 128 | 107 | 84 |
|  | 5% | No | 160 | 103 | 59 |
|  |  | Yes | 153 | 127 | 113 |
|  | 7% | No | 164 | 90 | 63 |
|  |  | Yes | 169 | 135 | 117 |
| 11 | 3% | Yes | 113 | 135 | 80 |
|  | 5% | Yes | 161 | 170 | 155 |
|  | 7% | Yes | 217 | 189 | 198 |
| 12 | 5% | No | 166 | 144 | 163 |
|  |  | Yes | 264 | 264 | 223 |
|  | 7% | Yes | 342 | 318 | 249 |
| 13 | 3% | Yes | 129 | 83 | Not Tested |
|  | 5% | No | 278 | 257 | Not Tested |
|  |  | Yes | 148 | 113 | 85 |
|  | 7% | Yes | 137 | 113 | 75 |
|  | 3% | Yes | 133 | 123 | 71 |
|  | 5% | Yes | 181 | 169 | 156 |
|  | 7% | Yes | 219 | 219 | 150 |
| 15 | 3% | Yes | 133 | 107 | 64 |
|  | 5% | Yes | 223 | 155 | 147 |

Construction of a Working Lease Road Incorporating Cuttings by a Process According to the Invention.

A volume of about 573 cubic meters (hereinafter usually abbreviated as "m³") that was constituted preponderantly of cuttings formed by drilling with an oil-based drilling mud and also included some fluidized bed fly ash (a material containing about 16% stoichiometric equivalent as $SO_3$ of sulfur) that had been added to the cuttings as a drying agent was used as the initial mixture comprising soil, rock, or both rock and soil to begin the process according to this invention. Analysis showed that this initial mixture contained 9.9 ppt of soluble sulfate and 86 ppt of total petroleum hydrocarbons and had a bulk density of 1.4 megagrams per cubic meter (hereinafter usually abbreviated as "Mg/m³"). Because this initial mixture contained too much sulfate for direct use in a process according to the invention as described above, the initial mixture was diluted with some of the native soil in this area, which is described as "Bengal-Denman association, moderately steep" by the U.S. Department of Agriculture Soil Conservation Service, (now named the Natural Resources Conservation Service). Further details about this soil are available in Soil Survey of Latimer County, Okla., Issue of December 1981. This soil was analyzed and found to contain 1.23 ppt of soluble sulfate and 15 ppt of total organic carbon and to have a bulk density 1.5 Mg/m3. Calculation shows that this soil can be mixed in a bulk volume ratio of 7:3 with the initial mixture of cuttings and fluidized bed fly ash to form an amended initial mixture with no more than 3 ppt of sulfate. Because this is still near the upper limit of sulfate that can be treated in a process according to this invention without concern, Portland Cement was selected as the stabilizer for use in the process according to the invention, inasmuch as Portland Cement is the most tolerant of sulfate of all the lime-based stabilizers shown in Table 1, and in particular "ASTM C 150, Type II" cement, a sulfate-tolerant type of cement, was selected. Consideration of Table 1 shows that 6.0 ppt of the cement should produce a satisfactory final structure.

Accordingly, the Bengal-Denman soil noted above was mixed with a volume fraction of 4% of the soil volume with this type of cement to form a combined stabilizer-diluent mixture. This mixture, because the cement has a bulk specific gravity of 3.14, contained 7.8 ppt of the cement.

A layer of the initial mixture containing oil-based cuttings and high sulfate as noted above, the layer being about 0.15 meters in depth and from 11 to 14 meters in width, was deposited along the line of the road to be constructed, and then covered with a second layer of the stabilizer-diluent mixture described above, this second layer being about 0.46 meters in depth and the same width as the first layer. The entire particulate contents of these two layers were then mixed with a soil stabilizer machine, a machine that is known in the art to achieve excellent mixing throughout the entire depth of particulates mixed. Sufficient water was then added atop this mixture to provide an amount of water by mass equal to 12 to 14% of the mass of the mixture, and after a pause of 30 minutes to allow the water to permeate through the depth of the particulate bed, the top of the bed was successively rolled with a "sheep's foot roller" that applied a pressure of 200 to 300 pounds per square inch, bladed, and rolled with a smooth roller which applied very little pressure and acted essentially as a finishing tool. A thickness of 0.4 centimeter of gravel was then spread over the top of the thus prepared road bed. All of these operations for the entire road construction were completed within three hours after the mixing of the stabilizer-diluent mixture with the initial mixture had begun.

Within two days after the construction, as described above, of a structure intended to serve as a road was completed, the structure began to be used as a road, and in over four months of service it has shown no evidence of deterioration of any type, including rutting, despite frequent passage over the road of tractor-trailer trucks and their loads totaling about eighty thousand pounds for each truck. There was heavy rain during this period, and conventional lease roads, consisting essentially of several inches thickness of gravel, that were in the same area and subjected to the same level of traffic loads needed frequent re-graveling to reduce rutting. Thus, the road constructed by a process according to the invention demonstrated clearly superior quality.

The invention claimed is:

1. A process for constructing a load-bearing structure incorporating drilling cuttings, said structure having a shape and a size and containing a continuous portion having a cross-sectional area at least as large as the area of a circle having a diameter of 101 millimeters, said process comprising operations of:
 (1) forming a particulate mixture comprising drilling cuttings; and
 (2) at least one of groups (2.1) and (2.2) of suboperations, said group (2.1) comprising suboperations of:
 (2.1.1) mixing said particulate mixture comprising drilling cuttings with at least one stabilizer selected from the group consisting of:
 (A) quicklime;
 (B) hydrated lime;
 (C) Portland Cement;
 (D) Class C fly ash;
 (E) cement kiln dust;
 (F) lime kiln dust;
 (G) Class F fly ash; and
 (H) other pozzolans to form a cementitious second mixture,
 (2.1.2) forming said cementitious second mixture into the shape and size of the load-bearing structure and developing structural strength within said shaped and sized second mixture by pozzolanic reaction to form said load-bearing structure,
 said load-bearing structure having sufficient resistance to rutting that any rut formed in such surface by 10,000 applications of a single axle load of 18,000 pounds will have a depth of rutting that is less than 1 inch;
 and said group (2.2) comprising suboperations of: (2.2.1) mixing said particulate mixture comprising drilling cuttings with at least one of foamed asphalt and emulsified asphalt to form an asphaltic second mixture; (2.2.2) forming said asphaltic second mixture into the shape and size of the load- bearing structure; and developing structural strength within the shaped and sized asphaltic second mixture by curing, said load-bearing structure having sufficient resistance to rutting that any rut formed in such surface by 10,000 applications of a single axle load of 18,000 pounds will have a depth of rutting that is less than 1 inch.

2. A process according to claim 1, wherein at least 10 percent by mass of said particulate mixture are deep drilling cuttings that have been generated by a process comprising the following suboperations:
 (1.1) providing drilling means, drilling driving means that cause the drilling means to operate at the bottom of a borehole, and drilling mud; and
 (1.2) causing said drilling driving means to drive said drilling means while said drilling mud flows into and out of said borehole through separate passageways disposed so as to insure that mud pumped into the borehole must reach the near vicinity of the drilling means that is deepening, widening, and/or otherwise increasing the volume of said borehole before the mud can enter any passageway through which a mixture of mud and cuttings flows out of the borehole during drilling, said mixture of mud and cuttings, optionally after removal therefrom of all or part of the constituents of said mixture that are not cuttings, constituting said deep drilling cuttings.

3. A process according to claim 2, wherein at least part of the deep drilling cuttings have been produced by drilling with a water-containing drilling mud.

4. A process according to claim 3, said process comprising group (2.1) of suboperations.

5. A process according to claim 4, wherein said stabilizer is selected from the group consisting of quicklime, hydrated lime, Portland Cement, Class C fly ash, lime kiln dust, cement kiln dust, and mixtures of Portland Cement with at least one of lime kiln dust, cement kiln dust, and Class C fly ash.

6. A process according to claim 5, wherein said stabilizer is a mixture of Portland Cement with at least one of lime kiln dust, cement kiln dust, and Class C fly ash; and
 suboperation (2.1.1) is accomplished in two stages, in the first of which at least one of lime kiln dust, cement kiln dust, and Class C fly ash is mixed with said particulate mixture comprising drilling cuttings and in the second of which Portland Cement is mixed into the mixture previously formed by mixing at least one of lime kiln dust, cement kiln dust, and Class C fly ash with said particulate mixture comprising drilling cuttings.

7. A process according to claim 6, wherein, based on the particulate mixture comprising drilling cuttings to be stabilized:
 the amount of Portland Cement used as a stabilizer is at least 1.0%;
 the amount of Class C fly ash used as a stabilizer is at least 2.0%; and
 the ratio of the amount of Class C fly ash used as a stabilizer to the amount of Portland Cement used as a stabilizer is at least 0.50:1.0 but is not more than 10:1.0.

8. A process according to claim 2, wherein at least part of the deep drilling cuttings have been produced by drilling with an oil-containing drilling mud.

9. process according to claim 8, said process comprising group (2.1) of suboperations.

10. A process according to claim 9, wherein said stabilizer is selected from the group consisting of quicklime, hydrated lime, Portland Cement, Class C fly ash, fluidized bed fly ash, lime kiln dust, cement kiln dust, and mixtures of Portland Cement with at least one of lime kiln dust, cement kiln dust, Class C fly ash, and fluidized bed fly ash.

11. A process according to claim 10, wherein:
 said stabilizer is a mixture of at least one of Class C fly ash, cement kiln dust, lime kiln dust, or fluidized bed fly ash with Portland Cement; and
 suboperation (2.1.1) is accomplished in two stages, in the first of which at least one of Class C fly ash, cement kiln dust, lime kiln dust, or fluidized bed fly ash is mixed with said particulate mixture comprising drilling cuttings and in the second of which Portland Cement is mixed into the mixture previously formed by mixing fly ash, cement kiln dust, lime kiln dust, or fluidized bed fly ash with said particulate mixture comprising drilling cuttings.

12. A process according to claim 11, wherein said load-bearing structure has an unconfined compressive strength of at least 100 psi and has a thickness of:
- at least 8 inches if constructed on a subgrade with a resilient modulus that is at least 15.0 kpsi;
- at least 12 inches if constructed on a subgrade with a resilient modulus that is at least 10.0 kpsi but less than 15.0 kpsi; and
- at least 16 inches if constructed on a subgrade with a resilient modulus that is at least 5.0 kpsi but less than 10.0 kpsi.

13. A process according to claim 10, wherein said load-bearing structure has an unconfined compressive strength of at least 100 psi and has a thickness of:
- at least 8 inches if constructed on a subgrade with a resilient modulus that is at least 15.0 kpsi;
- at least 12 inches if constructed on a subgrade with a resilient modulus that is at least 10.0 kpsi but less than 15.0 kpsi; and
- at least 16 inches if constructed on a subgrade with a resilient modulus that is at least 5.0 kpsi but less than 10.0 kpsi.

14. A process according to claim 7, wherein said load-bearing structure has an unconfined compressive strength of at least 100 psi and has a thickness of: at least 8 inches if constructed on a subgrade with a resilient modulus that is at least 15.0 kpsi;
- at least 12 inches if constructed on a subgrade with a resilient modulus that is at least 10.0 kpsi but less than 15.0 kpsi; and
- at least 16 inches if constructed on a subgrade with a resilient modulus that is at least 5.0 kpsi but less than 10.0 kpsi.

15. A process according to claim 6, wherein said load-bearing structure has an unconfined compressive strength of at least 100 psi and has a thickness of:
- at least 8 inches if constructed on a subgrade with a resilient modulus that is at least 15.0 kpsi;
- at least 12 inches if constructed on a subgrade with a resilient modulus that is at least 10.0 kpsi but less than 15.0 kpsi; and
- at least 16 inches if constructed on a subgrade with a resilient modulus that is at least 5.0 kpsi but less than 10.0 kpsi.

16. A process according to claim 5, wherein said load-bearing structure has an unconfined compressive strength of at least 100 psi and has a thickness of:
- at least 8 inches if constructed on a subgrade with a resilient modulus that is at least 15.0 kpsi;
- at least 12 inches if constructed on a subgrade with a resilient modulus that is at least 10.0 kpsi but less than 15.0 kpsi; and
- at least 16 inches if constructed on a subgrade with a resilient modulus that is at least 5.0 kpsi but less than 10.0 kpsi.

17. A process according to claim 4, wherein said load-bearing structure has an unconfined compressive strength of at least 100 psi and has a thickness of:
- at least 8 inches if constructed on a subgrade with a resilient modulus that is at least 15.0 kpsi;
- at least 12 inches if constructed on a subgrade with a resilient modulus that is at least 10.0 kpsi but less than 15.0 kpsi; and
- at least 16 inches if constructed on a subgrade with a resilient modulus that is at least 5.0 kpsi but less than 10.0 kpsi.

18. A process according to claim 3, wherein said load-bearing structure has an unconfined compressive strength of at least 100 psi and has a thickness of:
- at least 8 inches if constructed on a subgrade with a resilient modulus that is at least 15.0 kpsi;
- at least 12 inches if constructed on a subgrade with a resilient modulus that is at least 10.0 kpsi but less than 15.0 kpsi; and
- at least 16 inches if constructed on a subgrade with a resilient modulus that is at least 5.0 kpsi but less than 10.0 kpsi.

19. A process according to claim 2, wherein said load-bearing structure has an unconfined compressive strength of at least 100 psi and has a thickness of:
- at least 8 inches of constructed on a subgrade with a resilient modulus that is at least 15.0 kpsi;
- at least 12 inches if constructed on a subgrade with a resilient modulus that is at least 10.0 kpsi but less than 15.0 kpsi; and
- at least 16 inches if constructed on a subgrade with a resilient modulus that is at least 5.0 kpsi but less than 10.0 kpsi.

20. A process according to claim 1, wherein said load-bearing structure has an unconfined compressive strength of at least 100 psi and has a thickness of:
- at least 8 inches if constructed on a subgrade with a resilient modulus that is at least 15.0 kpsi;
- at least 12 inches if constructed on a subgrade with a resilient modulus that is at least 10.0 kpsi but less than 15.0 kpsi; and
- at least 16 inches if constructed on a subgrade with a resilient modulus that is at least 5.0 kpsi but less than 10.0 kpsi.

* * * * *

UNITED STATES PATENT AND TRADEMARK OFFICE
CERTIFICATE OF CORRECTION

PATENT NO. : 8,007,581 B2  
APPLICATION NO. : 12/605617  
DATED : August 30, 2011  
INVENTOR(S) : Jonathan Blake Scott et al.

Page 1 of 1

It is certified that error appears in the above-identified patent and that said Letters Patent is hereby corrected as shown below:

Column 7, line 6, reads "equivalent as $SO_3$, prefer ably is not more than, with"
should read -- equivalent as $SO_3$, preferably is not more than, with"

| Column 22, lines 9-10, read | "9 | Soil | 24 | 17 | 7 |
|---|---|---|---|---|---|
| | | Cuttings | 48 | 39 | 9" |
| should read | -- 9 | Soil | 24 | 17 | 7 |
| | | Cuttings | 48 | 39 | 9 -- |

Signed and Sealed this
Fourth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,007,581 B2 | Page 1 of 1 |
| APPLICATION NO. | : 12/605617 | |
| DATED | : August 30, 2011 | |
| INVENTOR(S) | : Jonathan Blake Scott et al. | |

It is certified that error appears in the above-identified patent and that said Letters Patent is hereby corrected as shown below:

Column 17, line 67, reads "E (in thousands of psi) 0.124(UCS{in PSI})+9.98."
should read -- E (in thousands of psi) $\geq$ 0.124(UCS{in PSI})+9.98. --

Signed and Sealed this
Eighteenth Day of October, 2011

David J. Kappos
*Director of the United States Patent and Trademark Office*